United States Patent Office 2,937,571
Patented May 24, 1960

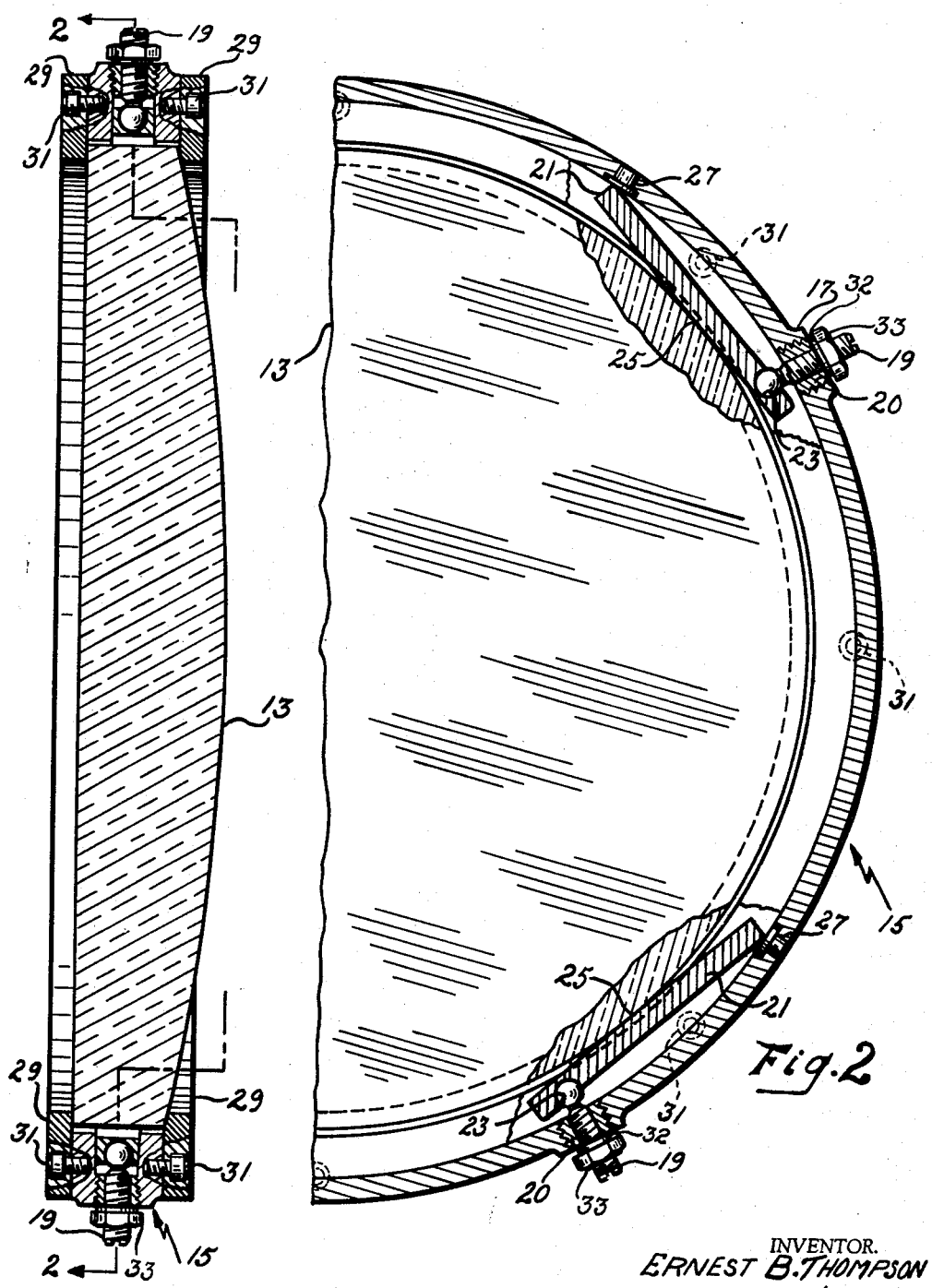

2,937,571

OPTICAL LENS MOUNT

Ernest B. Thompson, Auburndale, Mass., assignor to the United States of America as represented by the Secretary of the Air Force Filed Oct. 8, 1957, Ser. No. 689,015

2 Claims. (Cl. 88—57)

This invention relates to improved means for mounting optical elements and is concerned more particularly with an improved means for mounting larger diameter lenses wherein wide temperature variations do not appreciably affect the optical alignment of the mounted lenses.

The design specifications of aerial cameras frequently require that the individual lens elements must be so supported that the lateral displacement along the optic axis shall not exceed some very minute value. A lens mounted in a close fitting machined cell would, of course, maintain perfect relative alignment in the absence of temperature variations. However, under operating conditions as the temperature is decreased, the metal cell, because of its higher coefficient of heat transfer, would contract more rapidly than the glass, and probably cause the glass to fracture. Conversely, as the temperature increased, the cell would expand more rapidly than the glass, and as equilibrium was reached, the greater expansion of the metal, due to its higher coefficient of heat expansion, would leave the lens unrestrained and free to move laterally within the cell.

Various means and methods have been used and proposed in an attempt to avoid damage to an optical element while still restraining the element sufficiently to prevent excessive lateral displacement which would ordinarily result when the combined lens and mount is subjected to wide temperature variations. Most common is the interposition of some resilient material between the lens and its cell for the purpose of absorbing lateral shock and compensating for temperature variation effects. The resilient material usually takes the form of a gasket or a series of equally spaced shims for effectively centering the element. However, this method is objectionable for a number of reasons, among which is the fact that the interposed material is subject to deterioration and loss of resiliency after the passage of a certain time or after the unit has been subjected to a series of wide temperature variations, ordinarily resulting in loss of relative alignment of the optical axis of the various elements in the camera or other optical apparatus.

Another objection to the use of a gasket or shim material between the lens and the surrounding cell is that, because of the necessarily resilient nature of the material, great difficulty is encountered in attempting to optically align the element within the close tolerances necessary in aerial cameras or other precision equipment. This is so because of the lack of positive dimensional properties of the material under the loads required to retain the element in alignment in the cell.

Another commonly used method of mounting an optical element subject to wide temperature variations is the use of spring loaded members equally spaced around the periphery of the element. The objection to this method, as in the aforementioned method, is the difficulty of positively aligning the element in the cell. Inequality of the constant of loading springs, especially after being subjected to a series of wide temperature variations, undoubtedly results in relative misalignment of the elements after the instrument in which they are mounted has been in service for some time.

Still another expedient for mounting an optical element in a cell has been proposed whereby the element is encircled by a thin endless metallic strip which is pressed into place around the element. Means are provided for attaching the strip to the cell.

This method is objectionable because of the excessive radial load which necessarily must be applied by the strip to the element in order to retain the holding power of the strip in applications where wide temperature variations are encountered. Also, extraordinary dimensional accuracy of the metallic ring and element is necessary in order to properly fit the ring onto the optical element and in practice it is usually necessary to grind the element to fit the encircling ring in order to obtain the proper fit.

The present invention overcomes the aforementioned objections by providing equally spaced sources of point loading in the form of bars supported at each end by the cell and loaded at their center point by the element itself. Means are provided for varying the position of the bars in order to adjust the retained element to its optical center. Since the bars may be formed of metal, such as steel, there is no danger of drift caused by time deterioration of the holding material such as in case of resilient shims nor is there ordinarily any danger of overloading during assembly.

Accordingly, it is a primary object of the present invention to provide novel means for mounting large diameter aerial camera lenses, or the like, so as to maintain their optical alignment over wide temperature ranges, without producing excessive strains in the lenses and yet retaining the lenses with sufficient force to prevent any excessive lateral movement which would result in the inefficient operation of the precision optical instrument in which the lenses are mounted.

Another object of the invention is to provide means for mounting an optical element wherein there is provided a means for preventing loss of optical alignment of the element over relatively wide temperature ranges without resorting to the application of excessive strain-producing loads while assembling the element within its cell. By the use of metal positioning bars whose elastic limit is greater than the maximum thermal stress expected under operational conditions, any loosening and consequent lateral movement of the element in the cell is eliminated.

A further object is to eliminate the necessity of providing extremely accurate cell members to contain the optical element by providing means for adjusting and centering as well as retaining the optical element thereby compensating for any dimensional inaccuracies which may be present in the cell.

Still another object is to provide a novel lens mounting capable of absorbing to a certain extent the effect of lateral shock which may accidentally be applied to the element or cell under operating conditions or while the optical instrument is in transit.

A particular advantage gained by the use of the lens mount described herein is that excessive stresses on the lens are eliminated while still maintaining proper alignment with the other optical elements. This feature makes the mount especially useful for supporting larger diameter lenses used in aerial cameras where extreme accuracy in the alignment of the optical elements is required and it is necessary to keep the elements in accurate alignment even under adverse variations of temperature.

These and other objects, features and advantages will become more apparent after considering the following detailed description in connection with the accompanying drawings wherein like reference characters refer to like parts throughout the several views in which:

Fig. 1 is a cross sectional view through one form of the lens mount with the lens mounted in position; and Fig. 2 is a partial sectional view on the line 2—2 of Fig. 1.

Referring now to the drawings, the mount shown in one of its preferred embodiments is useful to retain the lens element 13 which for illustrative purposes is a plano-convex lens of relatively large diameter and of the type used in aerial cameras. The lens 13 is encircled by the lens cell 15 which is made of one of the light metal alloys used in the construction of components for aircraft. Around the outer surface of the cell 15 outwardly protruding bosses 17 are formed which serve to reinforce the cell and act as locating points for the adjusting screws 19. Threaded inserts 20 which may be made of steel are added to the lens cell in order to prevent wear and consequent loosening of the adjusting screws after the holder has been in use for a time.

The inner diameter surface of the cell 15 is channel shaped for retaining as well as preventing lateral movement of the bar members 21. It will be noted that considerable clearance has been allowed between the inner diameter of the cell and the outer diameter of the lens. This allows for substantial variations in diametral expansion and contraction of the cell and lens members without the detrimental effects such as loosening or stressing of the lens which conventional lens mounts tend to produce when subjected to wide temperature variations.

The adjusting screws 19 have spherically shaped contacting end portions which engage with the bars 21 to form universal ball-and-socket joints 23. The bars 21 contact the circumference of the lens 13 at the points 25. By proper manipulation of the adjusting screws 19, the load at points 25 for retaining the lens in axial position may be pre-set at any desired value.

Support shoes 27 made of a more durable material than the cell itself are mounted in the lens cell channel to firmly support the outer end of the beam 21 and to prevent the bar from deforming the metal of which the cell is fabricated. Retaining rings 29, held in position by the screws 31, serve to retain and align the lens 13 within the lens cell 15.

The lens may be easily assembled into the mount by first attaching one of the retaining rings 29 to the cell 15 using the screws 31 which are adapted to engage with threaded portions of the cell. The supporting bars 21 with their corresponding adjusting screws 19 are then inserted into their respective positions in the channel portion of the cell. Next, the lens 13 is centrally positioned within the cell and the adjusting screws 19 are turned inward until each of the bars 21 is in contact with the circumferential edge of the lens. The other retaining ring 29 is then attached in place to the cell and the lens is ready to be aligned by the proper manipulation of the adjusting screws. After the lens has been properly aligned and the correct retaining load applied by the bars 21, the washers 32 and the lock nuts 33 are attached and tightened so that the adjusting screws 19 remain fixed in their proper position.

In the embodiment of the lens mount shown, four bars 21 equally spaced at 90° intervals serve to retain and align the lens within the cell. It should be understood that similar results may be accomplished by using more or less than four bar members. For example, if three bars spaced 120° apart are used, the aligning procedure is greatly simplified but some of the retaining power is lost.

The amplitude of the load applied to the bars by the lens is determined by the initial requirements for retention of the lens in the mount and by the magnitude of the subsequent temperature variations to be encountered in use. The load requirements vary with the operating conditions of the mount and any ideal initial setting of the adjusting screws may be made for a given set of conditions.

Although the invention has been described with reference to a particular embodiment, it will be understood to those skilled in the art that various changes and modifications can be made therein without departing from the invention.

Having thus described my invention, what I claim as new and desire to secure by Letters Patent of the United States is:

1. A mount for supporting an optical element comprising a cell member having an inside diameter greater than the outside diameter of the supported optical element, said cell member being ring-shaped and having a groove on its inner face, a plurality of positioning bars equally spaced on the periphery of said cell member and located in said groove, said positioning bars being formed of a material having an elastic limit greater than the expected maximum thermal stresses to allow bending of said bars to prevent overstressing of said optical element, means for aligning the supported optical elements including adjusting screws having spherical end portions adapted to engage with socket portions near one end of said positioning bars to form ball-and-socket joints, the center portion of said positioning bars contacting the edge of said contained optical element, the other end of said positioning bars resting against the base of said groove, said positioning bars operating to laterally shift said supported optical element on movement of the engaging adjusting screws, means for locking said adjusting screws to prevent further shifting of said optical element after alignment, and retaining means including ring members attached to said cell member and engaging the outer portion of the face of the supported optical element for preventing the axial displacement thereof.

2. A mount for supporting an optical element comprising a cell member having an inside diameter greater than the outside diameter of the supported optical element, said cell member having a groove on the inner face thereof and completely surrounding the outer periphery of said supported optical element, means for holding said optical element within said cell member including a plurality of equiangularly spaced positioning bars, the ends of said bars disposed in the grooved portion of said cell member and an intermediate portion of each of said bars pressing against the outer edge of said optical element, said positioning bars being formed of a material having an elastic limit greater than the expected maximum thermal stresses to allow bending of said bars to prevent overstressing of said optical element, adjusting means for aligning said optical element including spherically headed screws passing through threaded wall portions of said cell member and engaging complementary socket portions found at one end of each of said positioning bars to form ball-and-socket joints, said adjusting means also serving to apply proper securing force to said supported element for substantially positive lateral constraint under varying thermal conditions, and a pair of retaining rings at least one of which is removably attached to said cell member, one ring on each side of said cell member juxtaposed with the face of the outer edge portion of the supported element and serving to retain it in axial position.

References Cited in the file of this patent

UNITED STATES PATENTS

| | | |
|---|---|---|
| 1,645,374 | Cox | Oct. 11, 1927 |
| 2,003,171 | Burrell | May 28, 1935 |
| 2,571,186 | Baxter | Oct. 16, 1951 |
| 2,571,187 | Baxter | Oct. 16, 1951 |